Patented Aug. 26, 1941

2,253,789

UNITED STATES PATENT OFFICE 2,253,789

DERIVATIVES OF FLUORANTHENE AND PROCESS OF MAKING SAME

Walter Kern, Sissach, and Theodor Holbro and Richard Tobler, Riehen, Switzerland, assignors to Society of Chemical Industry in Basle, Basel, Switzerland No Drawing. Application September 6, 1938, Serial No. 228,687. In Switzerland September 14, 1937

15 Claims. (Cl. 260—276)

This invention relates to the manufacture of derivatives of fluoranthene by causing a halogen substitution product of fluoranthene to react with a vattable compound containing at least three condensed six-membered rings of carbon atoms, further at least one hydrogen atom bound to a nitrogen atom, as well as at least one carbonyl group the carbon atom of which is a member of a six-membered ring; if desired, the product obtained may be treated with a halogenating agent.

For the reaction with halogen substitution product of fluoranthene which may contain 1, 2 or more halogen atoms, e. g. chlorine, bromine or iodine of the same or of different kinds, for example mono-, di- or tetrabromofluoranthene, various compounds e. g. aromatic vattable compounds containing at least three condensed six-membered rings of carbon atoms, further at least one hydrogen atom bound to a nitrogen atom, as well as at least one carbonyl group the carbon atom of which is a member of a six-membered ring may be used, and 1 mol of a polyhalogen fluoranthene may be caused to react with 2 or more mols of the same or different compounds, either simultaneously or in succession. Such vattable compounds may be anthraquinone derivatives or may belong to more highly condensed ring systems; for instance anthraquinones such as 1-amino-anthraquinone and 1-amino-arylaminoanthraquinones. Also aminoacylaminoanthraquinones, wherein the acyl residue may be that of an aliphatic, aromatic or heterocyclic acid, for example a carboxylic acid; compounds of this latter kind are, for instance 1-amino-4-benzoylaminoanthraquinone, 1-amino-5-benzoylaminoanthraquinone, 1-amino-5-benzoylamino-8-methoxyanthraquinone, 1-amino-5:8-dibenzoylaminoanthraquinone, 1-aminoanthraquinonoylaminoanthraquinone; also aminopyranthrones, aminoanthanthrones, aminoperylenequinones, aminodianthrones, amino-N-dihydro-anthraquinone-azines, aminoanthraquinoneazines, aminobenzpyrenequinones, aminoflavanthrenes and aminodibenzanthrones and aminoanthraquinone derivatives in which the 1- and 9-positions are members of a heterocyclic ring, for instance amino-1:9-anthrapyrimidines, amino-1:9 - anthrapyridones, amino-1:9 - isothiazolanthrones and amino-1:9-pyrazolanthrones; finally also aminoanthraquinones in which 2 carbon atoms in ortho-position to each other are members of a heterocyclic ring system as is the case, for instance, in amino-1:2-anthraquinone-acridones. Any of these compounds may contain further substituents.

In addition to the above mentioned aminoacylamino-anthraquinones there may also be used acylamino compounds in which the radical of the benzoic acid, or the radical of an anthraquinone carboxylic acid, is replaced by the radical of another acid, for example by the radical of acetic acid, propionic acid, butyric acid, stearic acid, phenylacetic acid, cinnamic acid, oxalic acid, succinic acid, halogen benzoic acids, alkoxy benzoic acids, alkyl benzoic acids, naphthalene carboxylic acids, phthalic acids, pyridine and quinoline carboxylic acids.

The reaction of the halogenated fluoranthene with the amine containing at least one reactive hydrogen atom is preferably accomplished by heating together the components in a solvent or diluent. There may be used the most various indifferent organic liquids, for example benzene, toluene or xylol. It is of advantage to work under exclusion of water and by using a solvent having a relatively high boiling point, for instance amyl alcohol, nitrobenzene or naphthalene and advantageously in presence of a catalyst as well as an acid binding agent. Temperatures above 150° C. are advantageously used. As in the following examples there have been named mainly cuprous chloride as catalyst and sodium acetate and sodium carbonate as acid-binding agent, it is to be stated that these agents yield very good results, it is true, but that the process can also be carried out with other catalysts, for example finely divided copper or other copper compounds or other metals, or also without catalysts, or by using other acid-binding agents such as for example calcium or barium carbonate or hydroxide, or also without acid-binding agents. All or only a part of the halogen atoms present in the fluoranthene compound may take part in the reaction.

The fluoranthene derivatives thus obtainable correspond to the general formula $$R-(NH-R_1)_n$$

wherein R stands for a fluoranthene radical, $R_1$ stands for a radical of a vattable compound containing at least three condensed six-membered rings of carbon atoms, as well as at least one carbonyl group the carbon atom of which is a member of a six-membered ring and $n$ stands at least for the number 1.

The treatment of the product obtained with a halogenating agent, for instance bromine, may occur with advantage in the presence of an indifferent solvent or diluent, for instance nitrobenzene.

The fluoranthene derivatives obtainable by the invention are useful as body colors for various purposes. For the most part they are also valuable intermediate products for making vat dyestuffs, e. g. according to the process described in our copending application Serial No. 228,688, while in certain instances they are themselves vat dyestuffs.

The following examples illustrate the invention; the relationship between the parts by volume and the parts by weight is that between the litre and the kilo:

*Example 1*

16.8 parts of 4-bromofluoranthene obtainable by brominating fluoranthene in carbon tetrachloride as described in Annalen der Chemie, vol. 488, page 111, 9 parts of anhydrous sodium carbonate, 9 parts of anhydrous sodium acetate, 21 parts of 1-amino-5 - benzoylaminoanthraquinone and 0.8 part of cuprous chloride are together suspended in 200 parts of nitrobenzene which has been dried by distilling 10 per cent of its weight, and the whole is heated for 16 hours at a temperature of 195–205° C. The mixture is filtered hot, the residue washed with nitrobenzene, benzene and alcohol and purified by extraction first with boiling hydrochloric acid and then with alcohol. There is obtained in good yield a brown crystalline powder soluble in concentrated sulfuric acid to an olive green solution and melting at 320° C. and vatted with great difficulty. Analysis shows that it is 5'-benzoylamino-1'-anthraquinonyl-aminofluoranthene of the probable formula

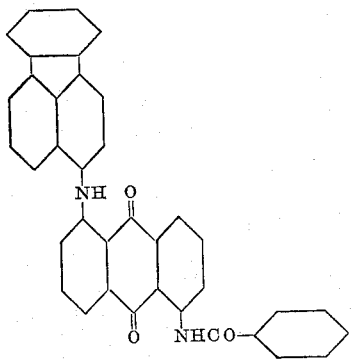

By analogous reaction of 4-bromofluoranthene with 1-amino - 4 - benzoylaminoanthraquinone there is obtained 4'-benzoylamino-1'-anthraquinoyl-4-aminofluoranthene of the probable formula

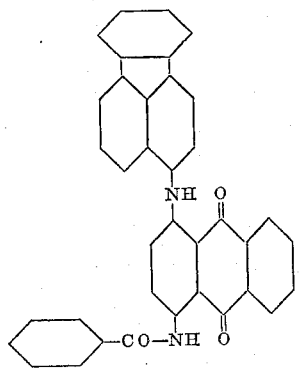

which is a dark green crystalline powder soluble in concentrated sulfuric acid to a green solution, melting at 310–315° C. and vatted with great difficulty.

*Example 2*

7.2 parts of dibromofluoranthene, obtainable by brominating fluoranthene in carbon bisulfide as described in Annalen der Chemie, vol. 488, page 115, 9 parts of 1-aminoanthraquinone, 7 parts of anhydrous sodium acetate and 1.6 parts of cuprous chloride are together suspended in 145 parts of nitrobenzene and the whole is stirred for 16 hours at a temperature of 190–200° C.

The mixture is filtered hot and the solid matter is washed with nitrobenzene and with benzene and alcohol; for purification it is extracted hot first with dilute hydrochloric acid and then with alcohol. There is obtained in good yield a brown crystalline powder of the probable formula

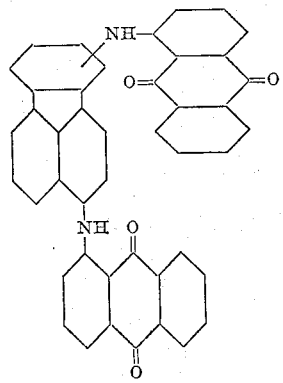

which colors concentrated sulfuric acid yellow olive, has a melting point above 400° C. and is vatted with great difficulty.

*Example 3*

7.2 parts of dibromofluoranthene, obtainable by brominating fluoranthene, 13 parts of 1-amino-4-benzoylaminoanthraquinone, 1.6 parts of cuprous chloride and 7 parts of anhydrous sodium acetate are together suspended in 156 parts of nitrobenzene and the whole is stirred for 16 hours at a temperature of 190–200° C. Hot filtration and washing with nitrobenzene, benzene and alcohol follow and for removing copper compounds the mass is extracted hot first with dilute hydrochloric acid and then with alcohol. The condensation product which probably contains chiefly the product of the formula anthraquinonyl)-diaminofluoranthene of the probable formula

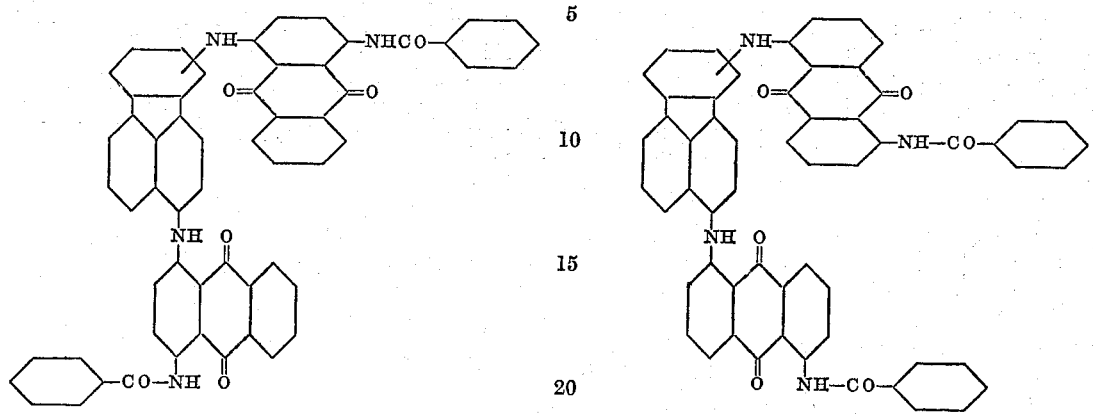

obtained in good yield is in the form of green needles which color concentrated sulfuric acid brown-olive, are decomposed at 400–405° C. and are vatted with great difficulty.

By brominating in nitrobenzene the product obtained with the proportion of bromine necessary for introducing 2 atoms, there is obtained a greenish black powder which dissolves in concentrated sulfuric acid to an olive solution, does not melt below 460° C. and is not capable of being vatted.

*Example 4*

18 parts of anhydrous sodium acetate and 18 parts of anhydrous sodium carbonate are added to 380 parts of nitrobenzene and the whole is kept boiling until 50 parts of nitrobenzene have distilled. After cooling to 200° C., 21.6 parts of dibromofluoranthene, obtainable by brominating fluoranthene in nitrobenzene, 46 parts of 1-amino-4-benzoylaminoanthraquinone and 1.6 parts of cuprous chloride are added and the whole is stirred for 48 hours at 195–205° C. Hot filtration and washing with nitrobenzene, benzene and alcohol follow and the product is further purified by extracting it with boiling hydrochloric acid, filtering, washing and drying. There is obtained a very good yield (over 95 per cent) of a greenish-black crystalline powder which colors concentrated sulfuric acid olive, melts at 410° C. and is vatted with great difficulty. Analysis shows that it is di-(4'-benzoyl-amino-1'-anthraquinonyl)-diaminofluoranthene of the probable formula given in Example 3.

*Example 5*

9 parts of anhydrous sodium acetate, 9 parts of anhydrous sodium carbonate, 11 parts of dibromofluoranthene, 21 parts of 1-amino-5-benzoylaminoanthraquinone and 0.8 part of cuprous chloride are together suspended in 165 parts of dry nitrobenzene and the whole is stirred for 16 hours at 190–200° C. The mass is now filtered hot and the solid matter washed with nitrobenzene and with alcohol and for the further purification extracted hot with dilute hydrochloric acid and then with alcohol, filtered, washed and dried. There is obtained a good yield of a dark brown crystalline powder which colors concentrated sulfuric acid olive and melts at 420° C. Analysis shows it to be di-(5'-benzoylamino-1'-anthraquinonyl)-diaminofluoranthene of the probable formula.

*Example 6*

1.8 parts of dibromofluoranthene, 2.8 parts of 1-amino-5-acetylaminoanthraquinone, 1.5 parts of anhydrous sodium acetate, 1.5 parts of anhydrous sodium carbonate and 0.15 part of cuprous chloride are together suspended in 60 parts of dry nitrobenzene and the whole is heated to boiling while stirring. When the reaction is complete, the mass is filtered hot and the solid matter is washed with nitrobenzene, benzene and alcohol, extracted hot with dilute hydrochloric acid, filtered, washed and dried. There is obtained a good yield of a black-red crystalline powder of the probable formula soluble in concentrated sulfuric acid to an olive green solution which does not melt below 450° C. and can be vatted only with great difficulty.

In similar manner there is obtained from 1 mol dibromofluoranthene and 2 mols 1-amino-5-(para-chloro)-benzoylaminoanthraquinone a brown powder soluble in concentrated sulfuric acid to an olive brown solution melting at 390–400° C. and not capable of being vatted.

The product of the reaction of 1 mol dibromofluoranthene with 2 mols 1-amino-5-cinnamoyl-aminoanthraquinone is a brown crystalline powder soluble in concentrated sulfuric acid to an olive green solution, melting with decomposition at 360–365° C. and capable of being vatted with great difficulty.

From dibromofluoranthene and 1-amino-5-β-anthraquinonoylaminoanthraquinone there is obtained in analogous manner a black powder of the probable formula

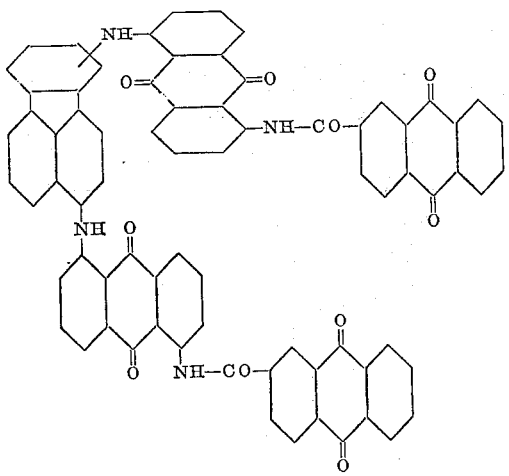

which does not melt at 450° C., is soluble in concentrated sulfuric acid to an olive brown solution and dyes cotton in a brown vat blackish olive tints.

*Example 7*

12 parts of anhydrous sodium acetate, 12 parts of anhydrous sodium carbonate, 10.4 parts of tetrabromofluoranthene, 27.4 parts of 1-amino-4-benzoylaminoanthraquinone and 1.1 parts of cuprous chloride are together suspended in 225 parts of dry nitrobenzene and the mixture is stirred for 22 hours at 190–200° C. The whole is filtered hot and the solid matter is washed with nitrobenzene, benzene and alcohol, and for further purification extracted hot with dilute hydrochloric acid and with alcohol; it is then filtered, washed and dried. There is obtained a black powder which colors concentrated sulfuric acid green and does not melt at 460° C. yet analysis shows it to be a tetra-(4'-benzolamino-1'-anthraquinonyl)-tetraminofluoranthene of the probable formula

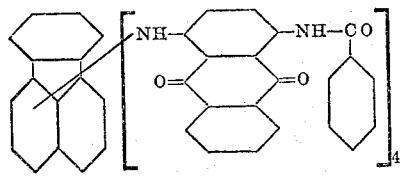

The tetrabromofluoranthene used in this example is made as follows: 101 parts of fluoranthene are dissolved in 830 parts of nitrobenzene and there are added while stirring and in the course of ¼ hour 324 parts of bromine. The mixture is heated in the course of 2 hours to 125° C. and stirred at this temperature for 3 hours. After cooling to 60° C., the whole is filtered and the solid matter is pressed, washed with alcohol and recrystallised from xylene. Tetrabromofluoranthene is thus obtained in the form of small yellow needles which melt at 304–306° C.

*Example 8*

6 parts of anhydrous sodium acetate, 6 parts of anhydrous sodium carbonate, 10.4 parts of tetrabromofluoranthene, obtained as described in Example 7, paragraph 2, 13.7 parts of 1-amino-4-benzoylaminoanthraquinone and 0.6 part of cuprous chloride are together suspended in 165 parts of dry nitrobenzene and the whole is stirred for 22 hours at 190–200° C. It is then filtered hot and the solid matter washed with nitrobenzene, benzene and alcohol, further purified by hot extraction with dilute hydrochloric acid and then with alcohol; it is finally filtered, washed and dried. It is a black powder which colors concentrated sulfuric acid olive and does not melt at 460° C. yet analysis shows it to be a dibromo-di-(4'-benzoylamino-1'-anthraquinonyl)-diaminofluoranthene of the probable formula

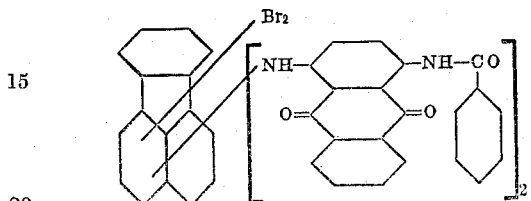

*Example 9*

2.7 parts of dibromofluoranthene, obtainable by brominating fluoranthene in nitrobenzene, 5.1 parts of 4-aminoanthraquinone-2:1(N)-benzeneacridone, 2.3 parts of anhydrous sodium acetate, 2.3 parts of anhydrous sodium carbonate and 0.2 part of cuprous chloride are together suspended in 60 parts of nitrobenzene and the whole is heated to boiling while stirring. When the reaction is complete, the mass is filtered hot and the solid matter is washed with nitrobenzene, benzene and alcohol and extracted with boiling dilute hydrochloric acid; it is then filtered and dried. The dyestuff of the probable formula

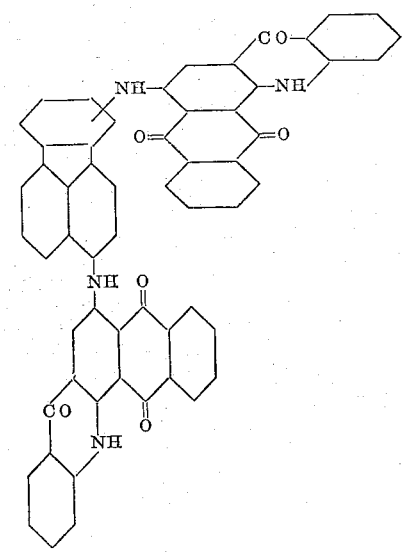

which is obtained in good yield is a dark blue-green crystalline powder which melts at 425–430° C. It dissolves in concentrated sulfuric acid to a brown solution and dyes cotton in a violet-red vat yellow-olive tints.

*Example 10*

10.8 parts of dibromofluoranthene, 19 parts of 1-amino-4-anilinoanthraquinone, 0.8 part of cuprous chloride, 9 parts of anhydrous sodium acetate and 9 parts of anhydrous sodium carbonate are together mixed with 250 parts of dry nitrobenzene and the whole is heated to boiling while stirring; when the reaction is complete, the product is worked up in the usual manner.

It is a black crystalline powder of the probable formula

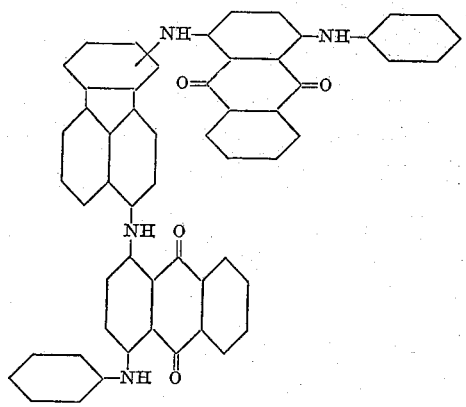

which melts at 410° C. with decomposition, is not capable of being vatted and dissolves in concentrated sulfuric acid to a blue solution.

By corresponding reaction of 1 mol dibromofluoranthene with 2 mols 1-amino-4-methoxyanthraquinone, there is obtained a black crystalline powder which decomposes at about 400° C., dissolves in concentrated sulfuric acid to a blue solution and is not capable of being vatted.

*Example 11*

5.4 parts of dibromofluoranthene are caused to react with 15 parts of aminodibenzanthrone in presence of 0.2 part of cuprous chloride, 5 parts of anhydrous sodium carbonate and 5 parts of anhydrous sodium acetate in 360 parts of boiling nitrobenzene. The product worked up in the usual manner is a dark green crystalline powder of the probable formula

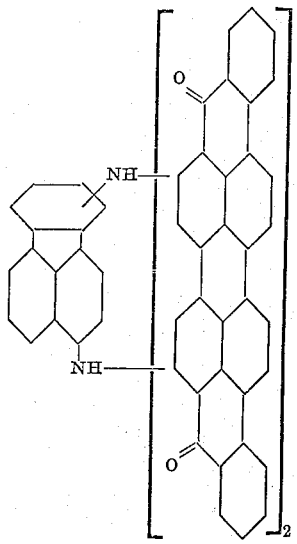

which does not melt below 450° C., dissolves in concentrated sulfuric acid to a blackish-red solution and dyes cotton grey-black in a blue vat.

*Example 12*

3.6 parts of dibromofluoranthene, 5.6 parts of 4-amino-N-methyl-1,9-anthrapyridone, 3 parts of anhydrous sodium carbonate, 3 parts of anhydrous sodium acetate and 0.3 part of cuprous chloride are together heated for 40 hours in 84 parts of boiling nitrobenzene while stirring. The mass is filtered hot and the solid matter purified in the usual manner. There is obtained in good yield a bluish black crystalline powder of the probable formula

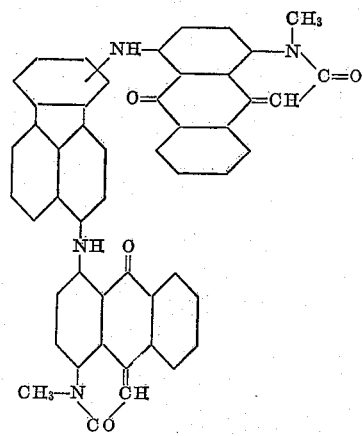

soluble in concentrated sulfuric acid to a blue solution, melting above 450° C. and incapable of being vatted.

In corresponding manner there is obtained from 1 mol dibromofluoranthene and 2 mols 5-aminoisothiazoleanthrone, a dark violet-brown crystalline powder of the probable formula

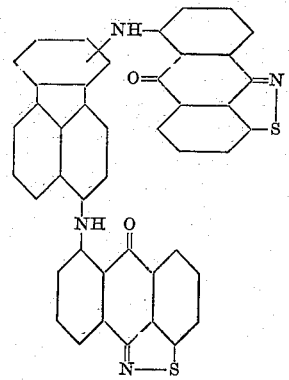

which melts with decomposition at 420-425° C., is vatted only with great difficulty and dissolves in concentrated sulfuric acid to an olive solution.

With 4-aminopyrazolanthrone there is obtained a brown powder of the probable formula

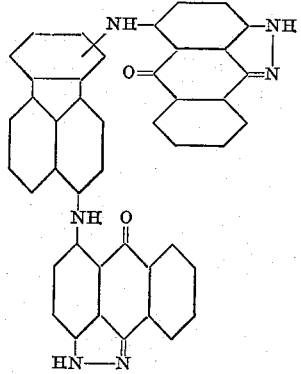

which does not melt below 450° C., is not capable of being vatted, and dissolves to a yellow-red solution in concentrated sulfuric acid.

*Example 13*

3.6 parts of dibromofluoranthene, 5 parts of 5-amino-1,9-anthrapyrimidine, 3 parts of anhydrous sodium carbonate, 3 parts of anhydrous sodium acetate and 0.3 part of cuprous chloride are together heated for 40 hours while stirring in 84 parts of boiling nitrobenzene. The mass is filtered hot and the solid matter purified as usual. There is obtained in very good yield a black-blue crystalline powder of the probable formula

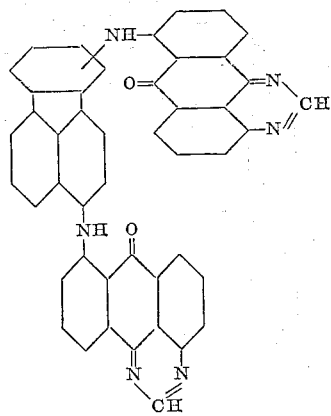

soluble in concentrated sulfuric acid to a green solution, melting above 450° C. and dyeing cotton in a brown vat grey-green tints.

With 4-amino-1,9-anthrapyrimidine there is obtained a red-brown powder which can be vatted only with great difficulty, melts with decomposition at 390° C. and dissolves in concentrated sulfuric acid to a red-brown solution.

Example 14

11.9 parts of dibromofluoranthene, 10.3 parts of 1-amino-4-benzoylaminoanthraquinone, 0.4 part of cuprous chloride, 4.5 parts of anhydrous sodium carbonate and 4.5 parts of anhydrous sodium acetate are together suspended in 275 parts of dry nitrobenzene and the whole is heated gradually in the course of 32 hours from 120° C. to 180° C. The mass is then filtered hot. From the filtrate there separates on cooling a green-black crystalline powder which, after filtration, washing and drying, melts with decomposition at 270–280° C. dissolves in concentrated sulfuric acid to a brown solution and is not capable of being vatted. Analysis shows that it is the mono-(4'-benzoyl-amino-1'-anthraquinonyl)-amino-mono-bromo-fluoranthene of the probable formula

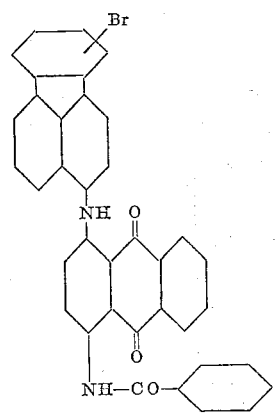

or

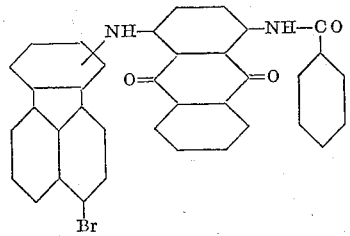

The mono-(5'-benzoylamino-1'-anthraquino-nyl)-amino-mono-bromofluoranthene is obtained in analogous manner. It is a black-brown crystalline powder which melts at 295–300° C., dissolves in concentrated sulfuric acid to a brown solution and is not capable of being vatted.

Example 15

If the mono-(4'-benzoylaminoanthraquinonyl)-amino-mono-bromofluoranthene, obtained as described in paragraph 1 of Example 14, is caused to react in the usual manner with a second mol of 1-amino-4-benzoylaminoanthraquinone, there is obtained the same product as is produced in Example 4.

If 1-amino-5-benzoylaminoanthraquinone is used, there is obtained a black crystalline powder of the probable formula

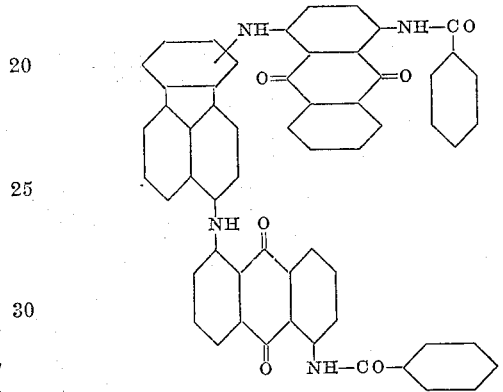

or

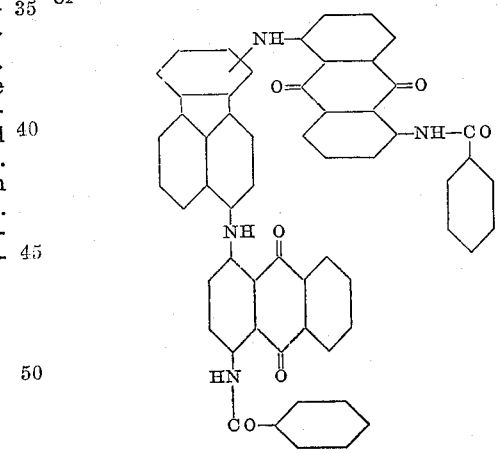

which melts at 365–370° C., dissolves in concentrated sulfuric acid to a brown-olive solution and can be vatted only with great difficulty.

A similar product is obtained if 1 mol dibromofluoranthene is caused to react simultaneously with 1 mol 1-amino-4-benzoylaminoanthraquinone and 1 mol 1-amino-5-benzoylaminoanthraquinone, or if the mono-(5'-benzoylamino-1'-anthraquinonyl)-amino-monobromofluoranthene described in the second paragraph of Example 14 is caused to react with 1 mol 1-amino-4-benzoylaminoanthraquinone.

Example 16

3.1 parts of the product of the reaction of 1 mol dibromofluoranthene with 1 mol of 1-amino-4-benzoylaminoanthraquinone (obtainable as described in Example 14, paragraph 1), 1.3 parts of 5-amino-isothiazolanthrone, 0.1 part of cuprous chloride, 0.8 part of anhydrous sodium acetate and 0.8 part of anhydrous sodium carbonate are suspended together in 60 parts of dry nitrobenzene and the whole is stirred at the boiling temperature for 24 hours. The mass is then filtered hot and the solid matter washed with nitrobenzene, benzene and alcohol, extracted with boiling hydrochloric acid and dried. The violet-black powder thus obtained melts at 420–425° C., dissolves in concentrated sulfuric acid to a brown-olive solution and is not capable of being vatted.

If 4-amino-N-methyl-1,9-anthrapyridone is used instead of 5-amino-isothiazolanthrone there is obtained a black crystalline powder which melts at 380–385° C. with decompositon; it dissolves in concentrated sulfuric acid to a black-red solution and is not capable of being vatted.

With 5-amino-1,9-anthrapyrimidine there is obtained a black crystalline powder which melts at 405–415° C., produces in strong sulfuric acid an olive color and is vatted only with difficulty. The product of reaction with 4-amino-1,9-anthrapyrimidine is also a black crystalline powder which melts at 380° C., dissolves in concentrated sulfuric acid to a brown solution and is vatted only with great difficulty.

What we claim is:

1. Process for the manufacture of derivatives of fluoranthene, comprising causing halogen substitution products of fluoranthene to react with vattable compounds containing at least three condensed six-membered rings of carbon atoms, further at least one carbonyl group the carbon atom of which is a member of a six-membered ring as well as at least one amino group selected from the class consisting of primary and secondary amino groups directly attached to a carbon atom of the condensed ring system.

2. Process for the manufacture of derivatives of fluoranthene, comprising causing dihalogen substitution products of fluoranthene to react with vattable compounds containing at least three condensed six-membered rings of carbon atoms, further at least one carbonyl group the carbon atom of which is a member of a six-membered ring as well as at least one amino group selected from the class consisting of primary and secondary amino groups directly attached to a carbon atom of the condensed ring system.

3. Process for the manufacture of derivatives of fluoranthene, comprising causing dibromo substitution products of fluoranthene to react with vattable compounds containing at least three condensed six-membered rings of carbon atoms, further at least one carbonyl group the carbon atom of which is a member of a six-membered ring as well as at least one amino group selected from the class consisting of primary and secondary amino groups directly attached to a carbon atom of the condensed ring system.

4. Process for the manufacture of derivatives of fluoranthene, comprising causing 1 mol of a dibromo substitution product of fluoranthene to react with 2 mols of vattable compounds containing at least three condensed six-membered rings of carbon atoms, further at least one carbonyl group the carbon atom of which is a member of a six-membered ring as well as a primary amino group directly attached to a carbon atom of the condensed ring system.

5. Process for the manufacture of derivatives of fluoranthene, comprising causing 1 mol of a dibromo substitution product of fluoranthene to react with 2 mols of an aminoacylaminoanthraquinone.

6. Process for the manufacture of derivatives of fluoranthene, comprising causing 1 mol of a dibromo substitution product of fluoranthene to react with 2 mols of 1-amino-5-benzoylaminoanthraquinone.

7. Process for the manufacture of derivatives of fluoranthene, comprising causing 1 mol of a dibromo substitution product of fluoranthene to react with 2 mols of 1-amino-4-benzoylaminoanthraquinone.

8. Process for the manufacture of derivatives of fluoranthene, comprising causing 1 mol of a dibromo substitution product of fluoranthene to react with 2 mols of 4-aminoanthraquinone 2:1-(N)-benzacridone.

9. Fluoranthene derivatives of the general formula $$R—(NH—R_1)_n$$

wherein R stands for a fluoranthene radical, $R_1$ stands for a radical of a vattable compound containing at least three condensed six-membered rings of carbon atoms as well as at least one carbonyl group the carbon atom of which is a member of a six-membered ring and $n$ stands for one of the numbers 1 to 4 inclusive.

10. Fluoranthene derivatives of the general formula $$R_1—NH—R—NH—R_2$$

wherein R stands for a fluoranthene radical, $R_1$ and $R_2$ stand for radicals of vattable compounds containing at least three condensed six-membered rings of carbon atoms, as well as at least one carbonyl group the carbon atom of which is a member of a six-membered ring.

11. Fluoranthene derivatives of the general formula $$R_1—NH—R—NH—R_2$$

wherein R stands for a fluoranthene radical and $R_1$ and $R_2$ stand for anthraquinone radicals.

12. Fluoranthene derivatives of the general formula $$R_1—NH—R—NH—R_2$$

wherein R stands for a fluoranthene radical and $R_1$ and $R_2$ stand for acylaminoanthraquinone radicals.

13. Fluoranthene derivatives of the formula

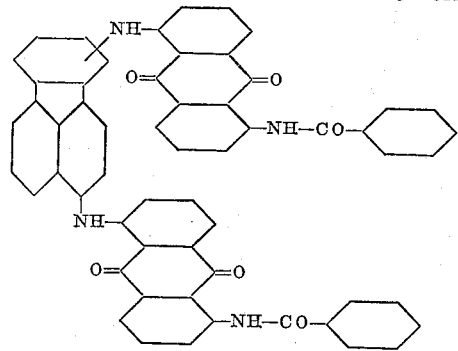

14. Fluoranthene derivatives of the formula

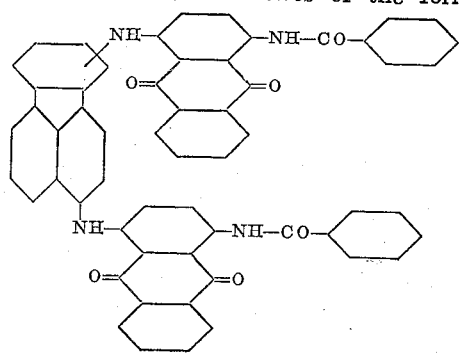

15. Fluoranthene derivatives of the formula
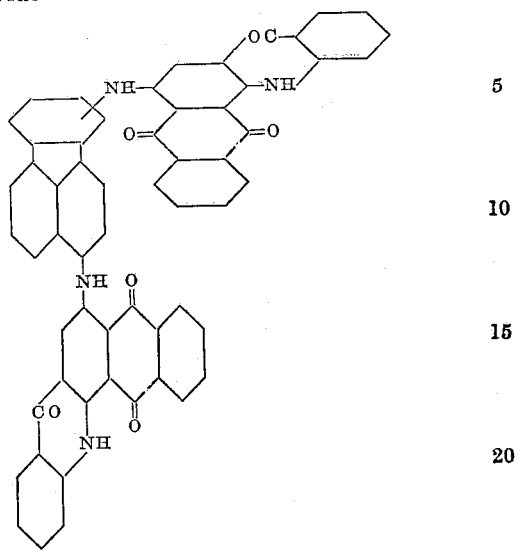
WALTER KERN.
THEODOR HOLBRO.
RICHARD TOBLER.